(12) United States Patent
Bell et al.

(10) Patent No.: US 9,282,434 B2
(45) Date of Patent: Mar. 8, 2016

(54) QUERY BASED VOLUME DETERMINATION

(71) Applicant: International Business Machines Corporation, Armonk, NY (US)

(72) Inventors: Denise A. Bell, Austin, TX (US); Lisa Seacat DeLuca, Baltimore, MD (US); Jana H. Jenkins, Raleigh, NC (US); Jeffrey A. Kusnitz, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 50 days.

(21) Appl. No.: 14/215,653

(22) Filed: Mar. 17, 2014

(65) Prior Publication Data
US 2015/0264528 A1 Sep. 17, 2015

(51) Int. Cl.
*H04W 24/00* (2009.01)
*H04W 4/02* (2009.01)

(52) U.S. Cl.
CPC .................... *H04W 4/023* (2013.01)

(58) Field of Classification Search
CPC .................................................. H04W 4/023
USPC .......................... 455/456.3, 556.1, 557, 569.1
See application file for complete search history.

(56) References Cited

U.S. PATENT DOCUMENTS

| | | | |
|---|---|---|---|
| 7,142,894 B2 * | 11/2006 | Ichikawa et al. ........... | 455/569.1 |
| 7,742,746 B2 | 6/2010 | Xiang et al. | |
| 2004/0192243 A1 | 9/2004 | Siegel | |
| 2004/0242160 A1 | 12/2004 | Ichikawa et al. | |
| 2007/0168359 A1 * | 7/2007 | Jacob et al. ..................... | 707/10 |
| 2010/0056173 A1 | 3/2010 | Bloom et al. | |
| 2011/0003614 A1 | 1/2011 | Langereis et al. | |
| 2011/0029359 A1 | 2/2011 | Roeding et al. | |
| 2011/0029370 A1 | 2/2011 | Roeding et al. | |
| 2012/0208507 A1 | 8/2012 | Zawacki et al. | |
| 2012/0214515 A1 | 8/2012 | Davis et al. | |

OTHER PUBLICATIONS

Dixon, C., "Quiet Down! Woman Kicked Off Train for Being Too Loud on Phone". NEWSONE for Black America. May 17, 2011. [online] [retrieved on: Dec. 9, 2013]. <http://newsone.com/1237415/woman-kicked-off-amtrak-for-talking-loud-phone/>.

(Continued)

*Primary Examiner* — Amancio Gonzalez
(74) *Attorney, Agent, or Firm* — John W. Hayes; William H. Hartwell

(57) ABSTRACT

An approach, carried out by one or more processors, for providing volume information to communication devices. The approach may further comprise receiving a query for a set of volume information for a first communication device. The volume information includes at least a volume range for audible communicating. The approach may further comprise determining if a second communication device is in a vicinity of the first communication device. Responsive to determining the second communication device is in the vicinity of the first communication device, the approach may further comprise determining a first location and a second location for the respective first communication device and second communication device. The approach may further comprise determining the set of volume information for the first communication device based on at least the second location of the second communication device.

15 Claims, 5 Drawing Sheets

(56) References Cited

OTHER PUBLICATIONS

Kayne, R., "What is Cell Phone Etiquette? (with pictures)". wiseGEEK. Copyright protected 2003-2013 Conjecture Corporation. [online] [retrieved on: Dec. 9, 2013]. <http://www.wisegeek.org/what-is-cell-phone-etiquette.htm#>.

Kayne. R., "What is a Cell Phone Jammer? (with pictures)". wiseGEEK clear answers for common questions. Copyright 2003-2014 Conjecture Corporation. [online] [retrieved on: Jan. 27, 2014] <http://www.wisegeek.org/what-is-a-cell-phone-jammer.htm>.

Lawson, S., "Ten Ways Your Smartphone Knows Where You Are". PC World. Apr. 6, 2012. <http://www.pcworld.com/article/253354/ten_ways_your_smartphone_knows_where_you_are.html>.

Nigh, M., "Carrier Pushes for Cellular Civility". Jun. 1, 1999. [online] [retrieved on: Dec. 4, 2012]. <http://connectedplanetonline.com/wireless/mag/wireless_carrier_pushes_cellular>.

Powell, E., "Cell Phone Etiquette". Office Solutions. Mar. 2001. pp. 13-16.

\* cited by examiner

QUERY BASED VOLUME DETERMINATION

TECHNICAL FIELD

The present invention relates generally to the field of mobile device volume information, and more particularly to determining volume information for audible conversations.

BACKGROUND

Current communication devices, specifically mobile phones, are tools utilized by individuals to communicate with one another. An individual utilizing a mobile phone is capable of audibly communicating with another individual while being located in various appropriate or inappropriate settings. An example of an appropriate setting is a public park where audibly communicating on a mobile phone does not interfere with any surrounding individuals. An example of an inappropriate setting is at a museum where audibly communicating on a mobile phone interferes with any surrounding individuals. Individuals in the surrounding area may not always approach the individual audibly communicating on the mobile device to notify them that the volume level exceeds appropriate levels for the surrounding area.

SUMMARY

In an embodiment, a computer-implemented method for providing volume information to communication devices comprises receiving, by one or more processors, a query for a set of volume information for a first communication device, wherein the volume information includes at least a volume range for audibly communicating; determining, by one or more processors, if a second communication device is in a vicinity of the first communication device; responsive to determining the second communication device is in the vicinity of the first communication device, determining, by one or more processors, a first location and a second location for the respective first communication device and second communication device; and determining, by one or more processors, the set of volume information for the first communication device based on at least the second location of the second communication device.

In another embodiment, a computer program product for providing volume information to communication devices comprising one or more computer readable tangible storage media and program instructions stored on at least one of the one or more storage media, the program instructions comprising program instructions to receive a query for a set of volume information for a first communication device, wherein the volume information includes at least a volume range for audibly communicating; program instructions to determine if a second communication device is in a vicinity of the first communication device; responsive to determining the second communication device is in the vicinity of the first communication device, program instructions to determine a first location and a second location for the respective first communication device and second communication device; and program instructions to determine the set of volume information for the first communication device based on at least the second location of the second communication device.

In another embodiment, a computer system for providing volume information to communication devices comprising one or more computer processors, one or more computer readable storage media storing program instructions, wherein the computer processor executes the program instructions to receive a query for a set of volume information for a first communication device, wherein the volume information includes at least a volume range for audibly communicating; to determine if a second communication device is in a vicinity of the first communication device; responsive to determining the second communication device is in the vicinity of the first communication device, to determine a first location and a second location for the respective first communication device and second communication device; and to determine the set of volume information for the first communication device based on at least the second location of the second communication device.

In another embodiment, the present invention provides a method for deploying a system for identifying a location of a mobile device, comprising: providing a computer infrastructure being operable to: receive location information from a mobile device, wherein the location information includes a sampling of location coordinates of the mobile device over a period of time; generate a path, using the sampling of location coordinates of the mobile device over the period of time; compare the path to geographic information system (GIS) data associated with the received location information; and determine additional location information based on the path and the GIS data.

DETAILED DESCRIPTION

Currently, there may be instances where an individual with a mobile phone is moving between multiple settings, where the individual is moving from an appropriate setting to an inappropriate setting while audibly communicating on the mobile device. The individual may not know if the setting is appropriate or inappropriate for audibly communicating on a mobile device. Similarly, if the individual with the mobile phone is participating in an audible communication and the individual determines the audible communication contains sensitive matter, the individual may not know an appropriate volume level at which to communicate such that individuals in the surrounding area do not overhear the conversation.

Embodiments in accordance with the present invention provide volume information to communication devices by receiving a query for volume information for a communication device, where other communication devices may be present in the vicinity of the querying communication device. Embodiments in accordance with the present invention have the ability to determine if any other communication devices are present in the vicinity. Responsive to determining there is another communication device in the vicinity, a location is determined for both the querying communication device and the other communication device in the vicinity. Embodiments in accordance with the present invention also have the ability to determine volume information for the communication device based on at least the location of the other communication device with respect to the location of the querying communication device.

Figure 1:
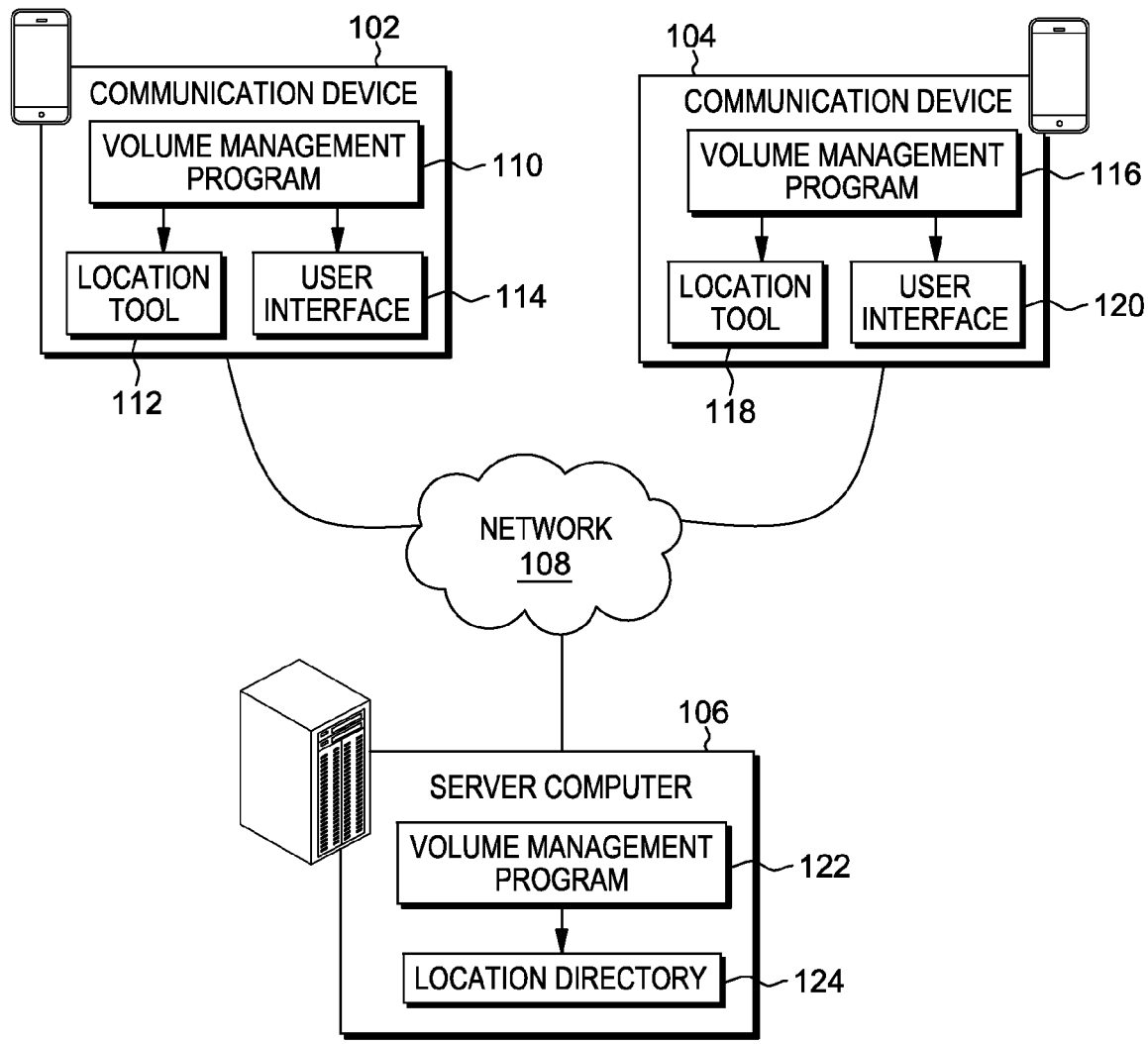
FIG. 1 is a functional block diagram illustrating a distributed data processing environment, in accordance with an embodiment of the present invention.

FIG. 1 is a functional block diagram illustrating a distributed data processing environment, in accordance with one embodiment of the present invention. The distributed data processing environment includes communication device 102, communication device 104, and server computer 106 interconnected over network 108.

Communication device 102 and communication device 104 may be a desktop computer, a laptop computer, a tablet computer, a radio headset, a Bluetooth® headset, a smartphone, or any other computer-based device capable of audible transmission. An audible transmission is any type of audio that can be electronically distributed such as, a phone call. For discussion purposes, in this embodiment a user of communication device 102 is on a phone call with another user of another communication device, not illustrated in FIG. 1.

Server computer 106 may be a desktop computer, a laptop computer, a tablet computer, a specialized computer server, a smartphone, or any other computer-based device known in the art. In certain embodiments, server computer 106 represents a computer system utilizing clustered computers and components that act as a single pool of seamless resources when accessed through network 108, as is common in data centers and with cloud computing applications. In general, server computer 106 is representative of any programmable electronic device or combination of programmable electronic devices capable of executing machine-readable program instructions and communicating with other computer devices via a network. In this embodiment, server computer 106 has the ability to communicate with other computer devices to query the computer devices for information.

Volume management program 110 residing in communication device 102 has the ability to provide volume information based on a query received through user interface (UI) 114 from a user of communication device 102. The volume information provides audible ranges based at least on a location of communication device 102 with respect to the environment or a location of communication device 102 with respect to other communication devices (i.e., communication device 104).

Location tool 112 residing in communication device 102 has the ability to provide a location for a user of communication device 102. In the illustrated embodiment, volume management program 110 communicates with location tool 112 to obtain the location for communication device 102 with respect to the environment and with respect to other communication devices (i.e., communication device 104). In another embodiment, location tool 112 can reside in volume management program 110. Similar to location tool 112, location tool 118 residing in communication device 104 has the ability to provide a location for a user of communication device 104.

In general, network 108 can be any combination of connections and protocols that will support communications between communication device 102, communication device 104, and server computer 106. Network 108 can include, for example, a local area network (LAN), a wide area network (WAN) such as the internet, a cellular network, or any combination of the preceding, and can further include wired, wireless, and/or fiber optic connections.

In one embodiment, volume management program 122 residing in server computer 106 can be a web service accessible via network 108 to users of communication device 102 and communication device 104. Volume management program 122 can handle queries from both communication device 102 and communication device 104 for volume information. Volume management program 122 can communicate with location tool 112 and location tool 118 to obtain respective locations for communication device 102 and communication device 104.

Location directory 124 residing in server computer 106 has the ability to communicate with volume management program 122 to identify locations for communication device 102 and communication device 104 based on information received from the respective location tool 112 and location tool 118. Location directory 124 can be a web service that volume management program 122 can query for a location (e.g., movie theater) based on information received from communication device 102 and communication device 104.

In various embodiments of the present invention, server computer 106 can be a laptop computer, a tablet computer, a netbook computer, a personal computer (PC), a desktop computer, a personal digital assistant (PDA), a smartphone, or any programmable electronic device capable of communicating with communication device 102 and communication device 104 via network 108.

User interface (UI) 114 on communication device 102 displays information that any one of the processes of volume management program 110 may display to a user. User interface 114 can be, for example, a graphical user interface (GUI) or a web user interface (WUI) that displays text, documents, web browser windows, user options, application interfaces and instructions for operation. User interface 114 also has the ability to receive user inputs for volume management program 110. Similar to user interface 114, user interface 120 on communication device 104 displays information that any one of the processes of volume management program 116 may display to a user. User interface 120 also has the ability to receive user inputs for volume management program 116.

Figure 2:
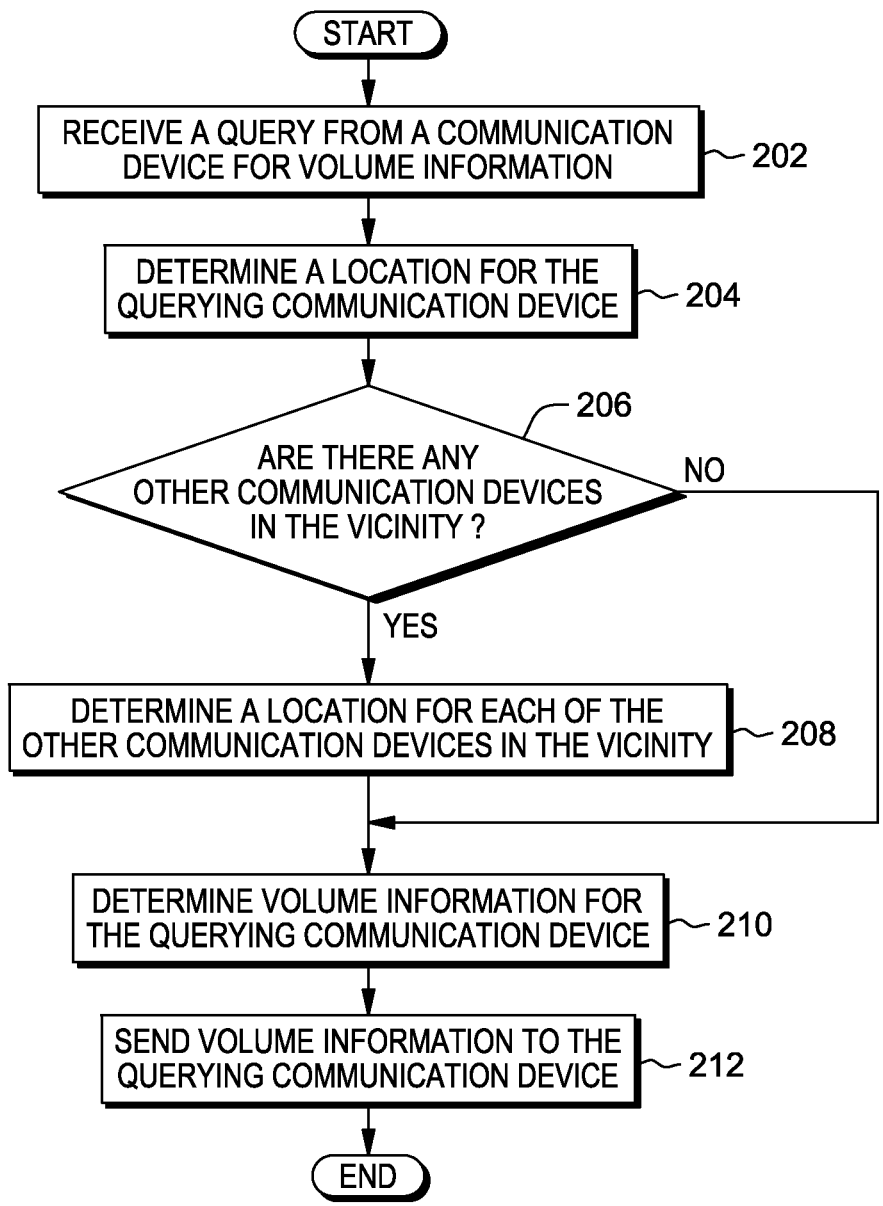
FIG. 2 is a flowchart depicting operational steps of a volume management program, in accordance with an embodiment of the present invention.

FIG. 2 is a flowchart depicting operational steps of a volume management program for a query based volume determination, in accordance with an embodiment of the present invention.

Volume management program 110 receives a query from a communication device for volume information (step 202). In this embodiment, a user of communication device 102 is on a phone call and audibly communicating with another communication device. Volume management program 110 receives a query from the user of communication device 102 for volume information, where the volume information contains an audible range for the user of communication device 102. In this embodiment, the audible range is a volume for which the user of communication device 102 can audibly communicate with respect to other users of communication devices (i.e., communication device 104) in the surrounding area. In another embodiment, an audible range is an appropriate volume for which the user of communication device 102 can audibly communicate with respect to a surrounding environment. An example of a surrounding environment is a library or a public park.

Volume management program 110 determines a location for the querying communication device (step 204). In this embodiment, the user of the querying communication device 102 is located in a library. Volume management program 110 can query location tool 112 to determine a location for the user of communication device 102. In this embodiment, location tool 112 is a Global Positioning System (GPS) based tool to determine a location of communication device 102. Volume management program 110 can receive the GPS values from location tool 112 and associate the GPS values with communication device 102. In another embodiment, location tool 112 utilizes cellular tower triangulation to determine a location for communication device 102.

In another embodiment, volume management program 110 can query a social networking programs on communication device 102 to determine if the user has inputted (i.e., checked-into) a location. For example, volume management program 110 can query a social networking program on communication device 102 for a previously inputted location. Volume management program 110 can determine if the latest inputted location meets a threshold time difference, where the threshold time difference is a period of time between when the user of communication device 102 inputted the location and when volume management program 110 queried the social networking program for the location. If volume management program 110 determines the period of time exceeds the threshold time difference, volume management program 110 determines not to use the inputted location for communication device 102. If volume management program 110 determines the period of time does not exceed the threshold time difference, volume management program 110 determines to use the inputted location for communication device 102.

Volume management program 110 determines if there are any other communication devices in the vicinity (decision step 206). In the event volume management program 110 determines there are no other communication devices in the vicinity ("no" branch, step 206), volume management program 110 determines volume information for the querying communication device (step 210). In the event volume management program 110 determines there is a least one other communication device in the vicinity ("yes" branch, step 206), volume management program 110 determines a location for each of the other communication devices in the vicinity (step 208).

In this embodiment, volume management program 110 queries other volume management program (e.g., volume management program 116) residing in communication devices (i.e., communication device 104) in a vicinity of communication device 102. The vicinity is a predetermined distance between communication device 102 and other possible communication devices in the area. Volume management program 110 can adjust the range of the query depending on the predetermined distance, where the query is only received by other volume management programs within the predetermined distance. Volume management program 110 can determine another communication device is in the vicinity when the query is received by the other communication devices. In this embodiment, volume management program 110 determines that communication device 104 with volume management program 116 is in the vicinity of communication device 102.

Volume management program 110 determines a location for each of the other communication devices in the vicinity (step 208). In this embodiment, volume management program 110 queries volume management program 116 for a location of communication device 104 which is the other communication device in the vicinity. Similar to volume management program 110, volume management program 116 utilizes a location tool (i.e., location tool 118) to determine the location for the user of communication device 104. In this embodiment, location tool 118 is a Global Positioning System (GPS) based tool to determine a location of communication device 104. Volume management program 116 can receive the GPS values from location tool 118 and associate the GPS values with communication device 104. Volume management program 110 receives the GPS values and determines the location of communication device 104 with respect to communication device 102. In another embodiment, location tool 112 utilizes cellular tower triangulation to determine a location for communication device 104.

In another embodiment, volume management program 110 can query volume management program 116 to determine if a user of communication device 104 has inputted (i.e., checkedinto) a location through a social networking program on communication device 104. For example, volume management program 116 can query a social networking program on communication device 104 for a previously inputted location. Volume management program 116 can determine if the latest inputted location meets a threshold time difference, where the threshold time difference is a period of time between when the user of communication device 104 inputted the location and when volume management program 116 queried the social networking program for the location. If volume management program 116 determines the period of time exceeds the threshold time difference, volume management program 116 determines not to use the inputted location for communication device 104. If volume management program 116 determines the period of time does not exceed the threshold time difference, volume management program 116 determines to use the inputted location for communication device 104. Volume management program 116 sends the inputted location for communication device 104 to volume management program 110.

Volume management program 110 determines volume information for the querying communication device (step 210). In this embodiment, volume management program 110 determines volume information for communication device 102 with respect to communication device 104. Volume management program 110 utilizes the determined locations for communication device 102 and communication device 104 to determine an audible volume for which a user of communication device 102 can communicate. The audible volume for communication device 102 is such that the user of communication device 104 cannot hear the audible conversation which the user of communication device 102 is engaging in. The audible volume correlates to the distance between the locations of communication device 102 and communication device 104.

In another embodiment, volume management program 110 determines there are no other communication devices in the vicinity ("no" branch, step 206). Volume management program 110 determines volume information for communication device 102 with respect to the environment of the determined location of communication device 102. For example, volume management program 110 determined the location of communication device 102 to be a library. In this example, the environment is the library and volume management program 110 determines an audible volume for which a user of communication device 102 can communicate. The audible volume for communication device 102 is such that the audible volume is appropriate for the location (i.e., the library). Volume management program 110 can determine the appropriate audible volume to be low or volume management program 110 can determine no audible conversation is appropriate for the location. Volume management program 110 can utilize a location directory where appropriate audible volumes are stored for each possible location.

Volume management program 110 sends volume information to the querying communication device (step 212). Volume management program 110 can send the volume information to user interface 114 to display the volume information to the user of communication device 102. In this embodiment, volume management program 110 can display the location of communication device 102 and communication device 104 and the distance between communication device 102 and communication device 104 in user interface 114. Volume management program 110 can also display the audible volume for which communication device 102 can communicate in user interface 114. In another embodiment, volume management program 110 can display the location of communication device 102 and the appropriate audible volume for the location in user interface 114.

Figure 3:
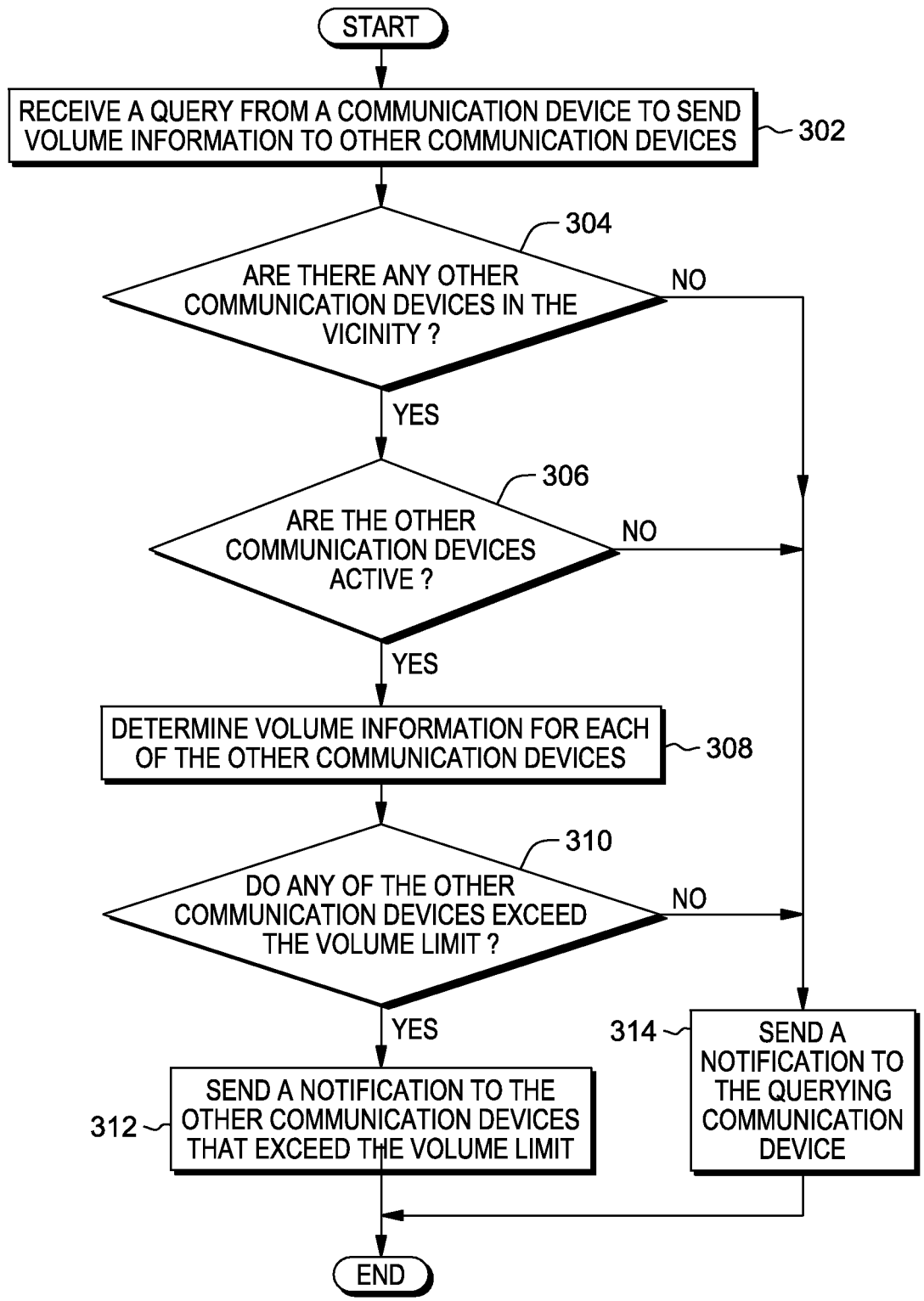
FIG. 3 is a flowchart depicting operational steps of a volume management program sending volume information, in accordance with one embodiment of the present invention.

FIG. 3 is a flowchart depicting operational steps of a volume management program for sending volume information to communication devices, in accordance with one embodiment of the present invention.

Volume management program 110 receives a query from a communication device to send volume information to other communication devices (step 302). In this embodiment, volume management program 110 receives a query from communication device 102 to send volume information to communication devices in the vicinity which are actively engaging in audible communications. The volume information contains an audible volume for each of the communication devices in the vicinity for which the users can audibly communicate without the user of communication device 102 hearing the conversation. Volume management program 110 can receive the query to send the volume information to other communication devices through user interface 114.

Volume management program 110 determines if there are any other communication devices in the vicinity (decision step 304). In the event volume management program 110 determines there are no other communication devices in the vicinity ("no" branch, step 304), volume management program 110 sends a notification to the querying communication device (step 314). In the event volume management program 110 determines there is at least one other communication device in the vicinity ("yes" branch, step 304), volume management program 110 determines if the other communication devices are active (decision step 306).

In this embodiment, volume management program 110 queries other volume management programs (e.g., volume management program 116) residing in communication devices (i.e., communication device 104) in a vicinity of communication device 102. The vicinity is a predetermined distance between communication device 102 and other possible communication devices in the area. Volume management program 110 can adjust the range of the query depending on the predetermined distance, where the query is only received by other volume management programs within the predetermined distance. Volume management program 110 can determine another communication device is in the vicinity when the query is received by the other communication devices. In this embodiment, volume management program 110 determines that communication device 104 with volume management program 116 is in the vicinity of communication device 102.

Volume management program 110 determines if the other communication devices are active (decision step 306). In the event volume management program 110 determines there are no other active communication devices ("no" branch, step 306), volume management program 110 sends a notification to the querying communication device (step 314). In the event volume management program 110 determines there is at least one other communication device that is active ("yes" branch, step 306), volume management program 110 determines volume information for each of the other communication devices that are active.

In this embodiment, the other communication device that is active is communication device 104, where a user of communication device 104 is actively engaging in an audible communication. Volume management program 110 can send a query which other volume management programs, such as, volume management program 116, can receive. Volume management program 116 can receive the query from volume management program 110 and determine if the user of communication device 104 is actively engaging in an audible conversation. Volume management program 110 can receive a response to the query specifying that the user of communication device 104 is actively engaging in an audible communication.

Volume management program 110 determines volume information for each of the other communication devices (step 308). In this embodiment, volume management program 110 determines volume information for communication device 104 with respect to communication device 102. Volume management program 110 utilizes a determined location for communication device 102 and communication device 104 to determine an audible volume for which a user of communication device 104 can communicate. The audible volume for communication device 104 is such that the user of communication device 102 cannot hear the audible conversation which the user of communication device 104 is engaging in. The audible volume correlates to the distance between the locations of communication device 102 and communication device 104.

Volume management program 110 determines if any of the other communication devices exceed the volume limit (decision step 310). In the event volume management program 110 determines none of the other communication devices exceed the volume limit ("no" branch, step 310), volume management program 110 sends a notification to the querying communication device (step 314). In the event volume management program 110 determines there is at least one other communication device that exceeds the volume limit ("yes" branch, step 306), volume management program 110 sends a notification to the other communication devices that exceed the volume limit (step 312).

In this embodiment, the volume limit is the audible volume for which a user of communication device 104 can audibly communicate without the user of communication device 102 hearing the conversation. Volume management program 110 has the ability to determine if the volume at which the user of communication device 104 is audibly communicating exceeds the volume limit based on the volume information volume management program 110 determined in step 308. Volume management program 116 on communication device 104 has the ability to send current volume levels of the user audibly communicating on communication device 104. Volume control program 110 can actively receive the current volume levels and determine if the volume limit is being exceeded.

Volume management program 110 sends a notification to the other communication devices that exceed the volume limit (step 312). In this embodiment, volume management program 110 sends a notification containing volume information to a volume management program (i.e., volume management program 116) on the other communication device (i.e., communication device 104) that exceeded the volume limit. The volume information contains at least the determined volume information of communication device 104, the volume limit which communication device 104 exceeded, and the current volume levels of the user of communication device 104 received by volume management program 110. Volume management program 110 can send the notification to volume management program 116 which can allow volume management program 116 to prompt the notification in user interface 120 on communication device 104.

Volume management program 110 sends a notification to the querying communication device (step 314). In this embodiment, volume management program 110 determined there are no other communication devices in the vicinity. Volume management program 110 can prompt a notification on user interface 114 indicating that there are no other communication devices in the vicinity to which volume management program 110 can send volume information. In another embodiments, volume management program 110 can determine there is another communication device in the vicinity but the user of the other communication device is not actively engaging in an audible communication. Volume management program 110 can prompt a notification on user interface 114 indicating that the other communication device in the vicinity is not actively engaging in an audible communication. Volume management program 110 can also determine there is another communication device in the vicinity that is actively engaging in an audible communication but the volume limit is not exceeded. Volume management program 110 can prompt a notification on user interface 114 indicating that the other communication device in the vicinity that is actively engaging in an audible communication has not exceeded the volume limit.

Figure 4A:
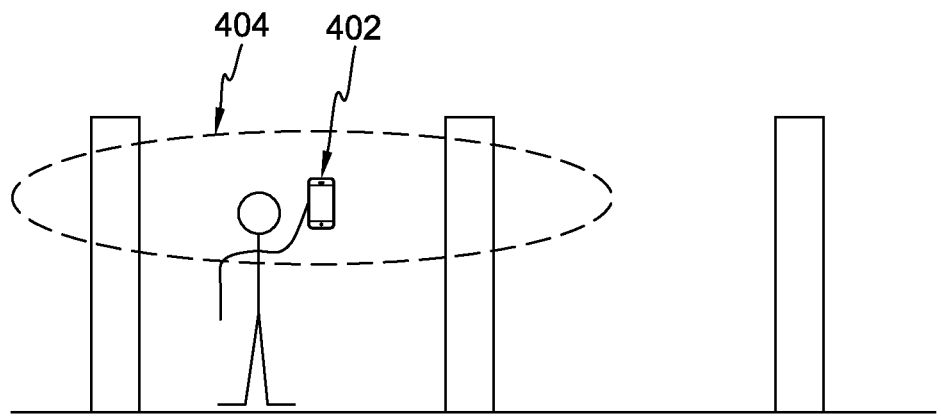
FIG. 4A illustrates an environment with a single user with a communication device, in accordance with one embodiment of the present invention.

FIG. 4A illustrates an environment with a single user with a communication device, in accordance with one embodiment of the present invention.

In this example, a user of communication device 402 is actively engaging in an audible communication while located in a library. The user of communication device 402 queries a volume management program residing in communication device 402 for volume information containing an audible volume deemed appropriate with respect to other users in the vicinity. The volume management program on communication device 402 determines there are no other communication devices in the vicinity and provides volume information to the user of communication device 402. The volume information contains an audible range, represented by volume range 404, for which the user of communication device 402 can actively engage in the audible communication.

Figure 4B:
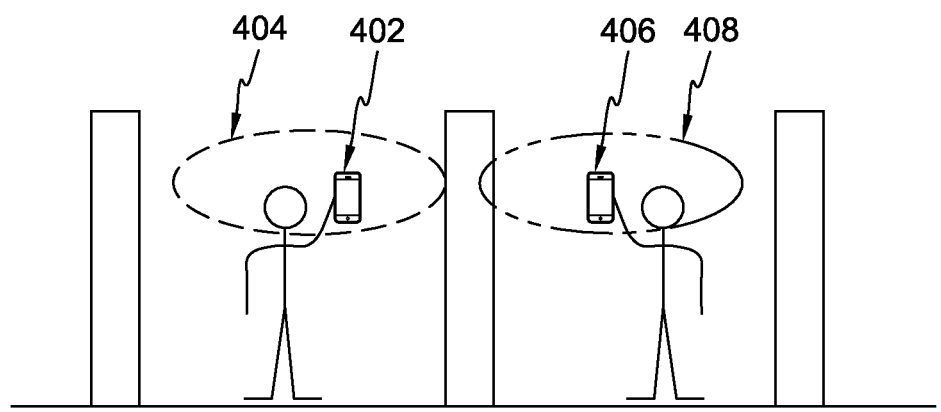
FIG. 4B illustrates an environment with two users each with a communication device, in accordance with one embodiment of the present invention.

FIG. 4B illustrates an environment with two users each with a communication device, in accordance with one embodiment of the present invention.

Continuing from the previous example in FIG. 4A, the user of communication device 402 is actively engaging in an audible communication when another user of a communication device walks into the vicinity of communication device 402. The user of communication device 402 queries the volume management program residing in communication device 402 for volume information containing an audible volume deemed appropriate with respect to other users in the vicinity (i.e., communication device 406). The volume management program on communication device 402 determines that communication device 406 is in the vicinity and provides volume information to the user of communication device 402 based on the location of communication device 406. The volume information contains an audible range, represented by volume range 404 which has decreased in size compared to the size of volume range 404 in FIG. 4A. Volume range 408 illustrates an audible range for communication device 406. Volume range 408 does not overlap volume range 404 since respective communication device 406 and communication device 402 can actively engage in an audible communication without hearing the other user's conversation.

Figure 5:
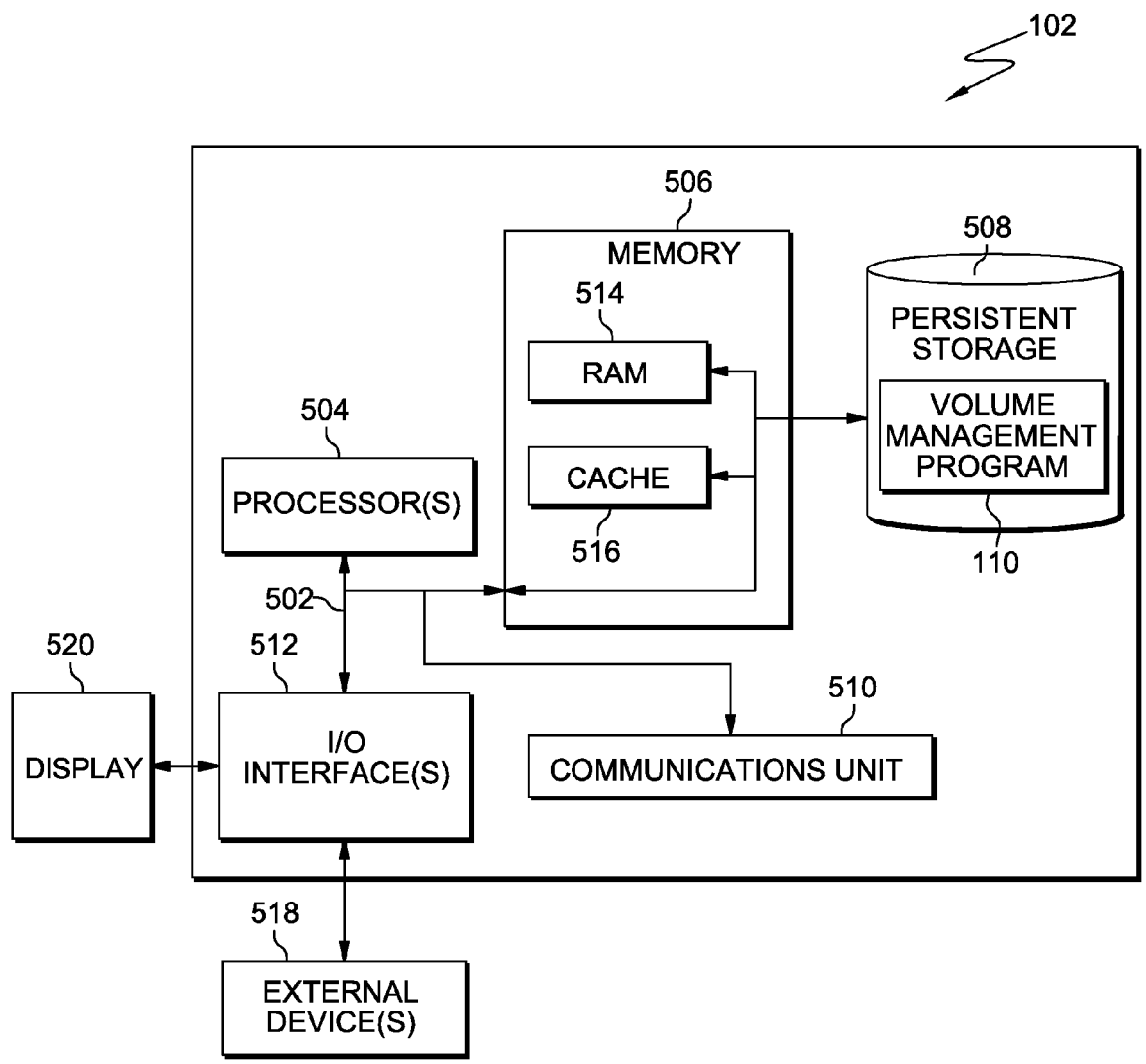
FIG. 5 is a block diagram of components of a computer system, such as the computer server of FIG. 1, in accordance with an embodiment of the present invention.

FIG. 5 depicts a block diagram of components of a computer, such as communication device 102, hosting volume management program 110 in accordance with an illustrative embodiment of the present invention. Although not illustrated, FIG. 5 can also depict a block diagram of components of communication device 104 and server computer 106, hosting volume management program 116 and volume management program 122, respectively, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Communication device 102 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are examples of computer readable tangible storage devices. A storage device is any piece of hardware that is capable of storing information, such as, data, program code in functional form, and/or other suitable information on a temporary basis and/or permanent basis. In this embodiment, memory 506 includes random access memory (RAM) 514 and cache memory 516. In general, memory 506 can include any suitable volatile or non-volatile computer readable storage medium.

Volume management program 110 is stored in persistent storage 508 for execution by one or more of computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage medium that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including systems and devices within or controlled by communication device 102. In these examples, communications unit 510 includes one or more wireless network interface cards. Communications unit 510 may provide communications through the use of either or both physical and wireless communications links. Computer programs and processes, such as volume management program 110, may be downloaded to persistent storage 508 through communications unit 510, or uploaded to another system through communications unit 510.

I/O interface(s) 512 allows for input and output of data with other devices that may be connected to communication device 102. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 may also connect to a display 520. Display 520 provides a mechanism to display data to a user and may be, for example, a touch screen or a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

In another embodiment, the invention provides a method that performs the process of the invention on a subscription, advertising, and/or fee basis. That is, a service provider, such as a Solution Integrator, could offer to provide volume information for communication devices. In this case, the service provider can create, maintain, support, etc., a computer infrastructure, such as communication device 102 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for volume information determination. In this case, a computer infrastructure, such as communication device 102 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system (FIG. 1), from a computer readable medium; (2) adding one or more computing devices to the computer infrastructure; and (3) incorporating and/or modifying one or more existing systems of the computer infrastructure to enable the computer infrastructure to perform the processes of the invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for providing volume information to communication devices, the method comprising:
    receiving, by one or more processors on a server computer, a query for a first set of volume information for a first communication device, wherein the first set of volume information includes at least a first volume range for a first user audibly communicating;
    receiving, by the one or more processors on the server computer, a query from the first communication device to send a second set of volume information to other communication devices in a vicinity;
    responsive to determining a second user with a second communication device is in the vicinity of the first communication device, determining, by the one or more processors on the server computer, a first location and a second location for the respective first communication device and second communication device;
    determining, by the one or more processors on the server computer, the second set of volume information for the second communication device based on at least the first location of the first communication device, wherein the second set of volume information includes a second volume range for the second user audibly communicating for which the first user will not hear the second user; and
    sending, by the one or more processors on the server computer, the second set of volume information to the second communication device.

2. The method of claim 1, further comprising:
    displaying, by the one or more processors on the server computer, the first set of volume information in a first user interface in the first communication device.

3. The method of claim 1, further comprising:
    determining, by the one or more processors on the server computer, the first set of volume information for the first communication device based on at least the first location.

4. The method of claim 1, further comprising;
    determining, by the one or more processors on the server computer, the second communication device is actively engaging in an audible conversation.

5. The method of claim 4, further comprising:
    determining, by the one or more processors on the server computer, a volume limit has been exceeded by the second communication device, wherein the volume limit is a highest value in the second volume range.

6. A computer program product for providing volume information to communication devices, the computer program product comprising:
    one or more computer readable storage media and program instructions stored on at least one of the one or more computer readable storage media, wherein the program instructions are executable by a server computer, and wherein the one or more computer readable storage media are not transitory signals per se, the program instructions comprising:
    program instructions to receive a query for a first set of volume information for a first communication device, wherein the first set of volume information includes at least a first volume range for a first user audibly communicating;
    program instructions to receive a query from the first communication device to send a second set of volume information to other communication devices in a vicinity;
    program instructions to, responsive to determining a second user with a second communication device is in the vicinity of the first communication device, determine a first location and a second location for the respective first communication device and second communication device;
    program instructions to determine the second set of volume information for the second communication device based on at least the first location of the first communication device, wherein the second set of volume information includes a second volume range for the second user audibly communicating for which the user will not hear the second user; and
    program instructions to send the second set of volume information to the second communication device.

7. The computer program product of claim 6, further comprising program instructions, stored on the one or more computer readable storage media, which when executed by a processor, cause the processor to:
    display the first set of volume information in a first user interface in the first communication device.

8. The computer program product of claim 6, further comprising program instructions, stored on the one or more computer readable storage media, which when executed by a processor, cause the processor to:
    determine the first set of volume information for the first communication device based on at least the first location.

9. The computer program product of claim 6, further comprising program instructions, stored on the one or more computer readable storage media, which when executed by a processor, cause the processor to:

determine the second communication device is actively engaging in an audible conversation.

10. The computer program product of claim 9, further comprising program instructions, stored on the one or more computer readable storage media, which when executed by a processor, cause the processor to:

determine volume limit has been exceeded by the second communication device, wherein the volume limit is a highest value in the second volume range.

11. A computer system for providing volume information to communication devices, the computer system comprising:
one or more computer processors;
one or more computer readable storage media;
program instructions stored on the one or more computer readable storage media, for execution by at least one of the one or more computer processors, the program instructions comprising:
program instructions to receive a query for a first set of volume information for a first communication device, wherein the first set of volume information includes at least a first volume range for a first user audibly communicating;
program instructions to receive a query from the first communication device to send a second set of volume information to other communication devices in a vicinity;
program instructions to, responsive to determining a second user with a second communication device is in the vicinity of the first communication device, determine a first location and a second location for the respective first communication device and second communication device;
program instructions to determine the second set of volume information for the second communication device based on at least the first location of the first communication device, wherein the second set of volume information includes a second volume range for the second user audibly communicating for which the user will not hear the second user; and
program instructions to send the second set of volume information to the second communication device.

12. The computer system of claim 11, further comprising program instructions, stored on the one or more computer readable storage media, which when executed by a processor, cause the processor to:

display the first set of volume information in a first user interface in the first communication device.

13. The computer system of claim 11, further comprising program instructions, stored on the one or more computer readable storage media, which when executed by a processor, cause the processor to:

determine the first set of volume information for the first communication device based on at least the first location.

14. The computer system of claim 11, further comprising program instructions, stored on the one or more computer readable storage media, which when executed by a processor, cause the processor to:

determine the second communication device is actively engaging in an audible conversation.

15. The computer system of claim 14, further comprising program instructions, stored on the one or more computer readable storage media, which when executed by a processor, cause the processor to:

determine volume limit has been exceeded by the second communication device, wherein the volume limit is a highest value in the second volume range.

* * * * *